United States Patent [19]
Faulk

[11] Patent Number: 5,945,807
[45] Date of Patent: Aug. 31, 1999

[54] CONVERTING BATTERY MODULE WITH BATTERY-POWERED CONTROLLER

[75] Inventor: Richard A. Faulk, Cypress, Tex.

[73] Assignee: Compaq Computer Corporation, Houston, Tex.

[21] Appl. No.: 08/921,304

[22] Filed: Aug. 29, 1997

[51] Int. Cl.[6] .................................................. H02J 7/00
[52] U.S. Cl. ............................................................ 320/128
[58] Field of Search .................................... 320/130, 128, 320/124, 148, DIG. 21, DIG. 29, 116, 103

[56] References Cited

U.S. PATENT DOCUMENTS

| 4,949,028 | 8/1990 | Brune | 320/116 |
| 5,592,067 | 1/1997 | Pater et al. | 320/103 |
| 5,694,302 | 12/1997 | Faulk | 323/262 |
| 5,821,734 | 10/1998 | Faulk | 320/124 |

OTHER PUBLICATIONS

"DS2435 Battery ID Chip", product announcement, Dallas Semiconductor.
"The L6901 Smart Battery Charger IC", product announcement, SGS–Thomson Microelectronics, Inc.
"One Chip Solution for Smart Battery Charger, the U24XX", product announcement, TEMIC.

*Primary Examiner*—Peter S. Wong
*Assistant Examiner*—Lawrence Luk
*Attorney, Agent, or Firm*—Robert Goover; Betty Formby

[57] ABSTRACT

A universal battery pack in which an internal switch-mode power converter's control circuitry is powered from the battery side of the converter, rather than from the system side.

28 Claims, 3 Drawing Sheets

CONVERTING BATTERY MODULE WITH BATTERY-POWERED CONTROLLER

BACKGROUND AND SUMMARY OF THE INVENTION

The present invention relates to voltage-converting battery modules, and to portable systems which include them.

Background: Battery Management

Currently the custom solutions to applications of rechargeable energy services are costly and inflexible. Chargers must be custom designed and cannot be interchanged. Batteries are unique for each application and have very unique charge and discharge characteristics. Complex algorithms are often used for charge/discharge control.

Recently some efforts have been made to standardize batteries, but they still require custom, highly specialized interface electronics. (Examples include the DuraCell PowerSmart™ battery models DR35 and DR121, Motorola battery models EP3656, and Molicell model ME202.) Even the "standards" that are being proposed are too unique and specialized, and require highly specialized interface electronics.

Background: Smart Battery Modules

In the 1990s some battery modules have included logic chips (either microcontrollers or programmed custom logic chips). These chips are used for charge/discharge control, communications, and related functions such as overtemperature and overcurrent monitoring, or for a "gas gauge" function which estimates battery life.

Background: Converting Battery Modules

A further development was introduced in the Fall of 1996 (less than one year before the effective filing date of the present application), when Compaq Computer Corporation shipped a battery module which included an integral DC—DC switching converter. The DC—DC converter provided precise regulation of the charging voltage applied to lithium-ion battery cells, and hence permitted lithium-ion compatibility to be retrofitted into a system which was not originally designed for it. (Specifically, this battery module was used with a system where the voltage regulation from the AC adapter was not precise enough to be a safe supply for charging lithium-ion batteries.)

Background: Lithium-Based Battery Technologies

Rechargeable lithium-ion is a promising battery technology which offers high energy density per unit weight, and high voltage per cell. See generally Linden, HANDBOOK OF BATTERIES (2.ed. 1995), which is hereby incorporated by reference. However, this class of battery chemistries has some limitations.

The high energy density and high cell voltage of lithium based battery technologies are extremely attractive. However, these same advantages are related to the fact that the electrochemical reactions in a lithium based battery technology are fairly energetic. Thus, when a lithium battery fails catastrophically, a substantial amount of heat can be released. Lithium batteries can fail due to overtemperature, overcurrent, overvoltage or undervoltage.

The conventional wisdom has uniformly been that every lithium-ion battery must include a cutoff transistor. Usually this is implemented with two VDMOS transistors back to back (i.e. coupled so that their built-in diodes are opposed). Thus one of the transistors can cut off charging current, the other transistor can cut off discharging current, and the battery can be entirely isolated by turning off both transistors. If an overheating or overcurrent condition occurs, one or both of these transistors is used to cut off the current, regardless of what control algorithm is being followed by an external power converter.

One problem with conventional cutoff transistors is that if a transistor fails in the ON state during normal operation, this may not be detected. Thus, a transistor which is kept in the on state during charging operation may be discovered to be inoperative at the moment when it is most needed, i.e. when it is opened to interrupt the connection for the charging current.

A removable battery pack, by definition, must have exposed terminals. Thus short-circuits are inherently a risk. Battery packs normally include a fuse which will blow, as a last resort, if a short-circuit occurs, but of course this takes the battery pack out of service (possibly permanently). Such a fuse is typically designed to blow only if transient current levels reach a level which is many times the maximum average current.

Converting Battery Module with Battery-Powered Controller

One of the surprising consequences of a voltage converting battery module is that the power voltage on the battery side of the converter is more stable than the voltage on the system side of the converter (because the system-side voltage is not known a priori). Therefore, the present application teaches that it is preferable to power the control circuitry from the battery side of the converter.

The problems of how to power the control circuitry become even more difficult when a DC-isolated converter topology is used, especially when the converter topology effects a polarity reversal. (In such cases there is no common ground line on the two sides of the isolating element.) In the presently preferred embodiment the converter is an isolated converter, and the control architecture uses a pair of controllers, on opposite sides of the isolating element, which are connected in a master-slave relationship. During normal operation the master converter is on the battery side.

In rechargeable lithium-ion battery technology the cells are never allowed to run all the way down (since damaging chemical reactions would occur), and hence there is always enough power left to power the control circuitry. (Indeed complete discharge is undesirable in most battery technologies, though it may sometimes occur due to self-discharge while a battery is on the shelf. However, there is no guarantee that this will always be true in every battery technology.) Thus one alternative class of embodiments provides a bleed current from the system side when the battery is depleted. This bleed current permits the slave converter to operate alone, to start charging when the battery is depleted.

This architecture provides many advantages, including at least the following:

The power to the control circuit is not affected by the unknown value of the system power bus voltage.

A single universal battery module can be plugged into unknown power busses, with minimal risk of improper operation of the control circuitry.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
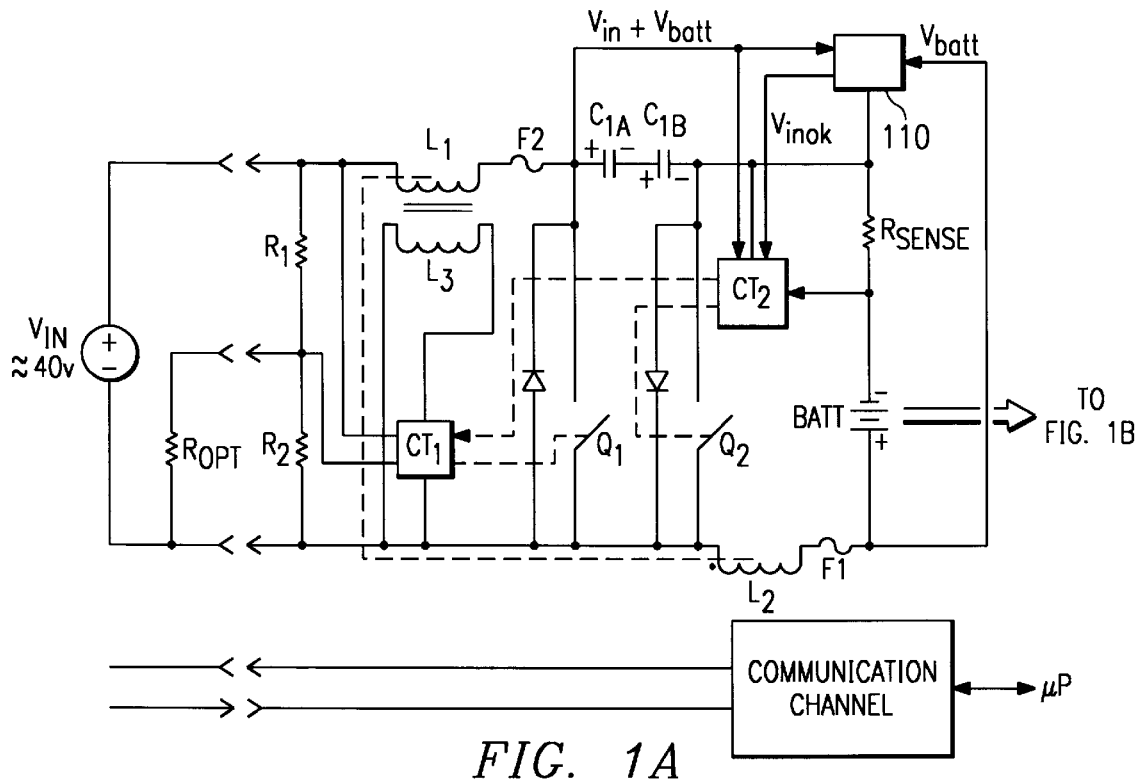
FIGS. 1A and 1B are two parts of a single figure, showing a sample battery controller board architecture of a sample innovative embodiment.
Figure 1B:
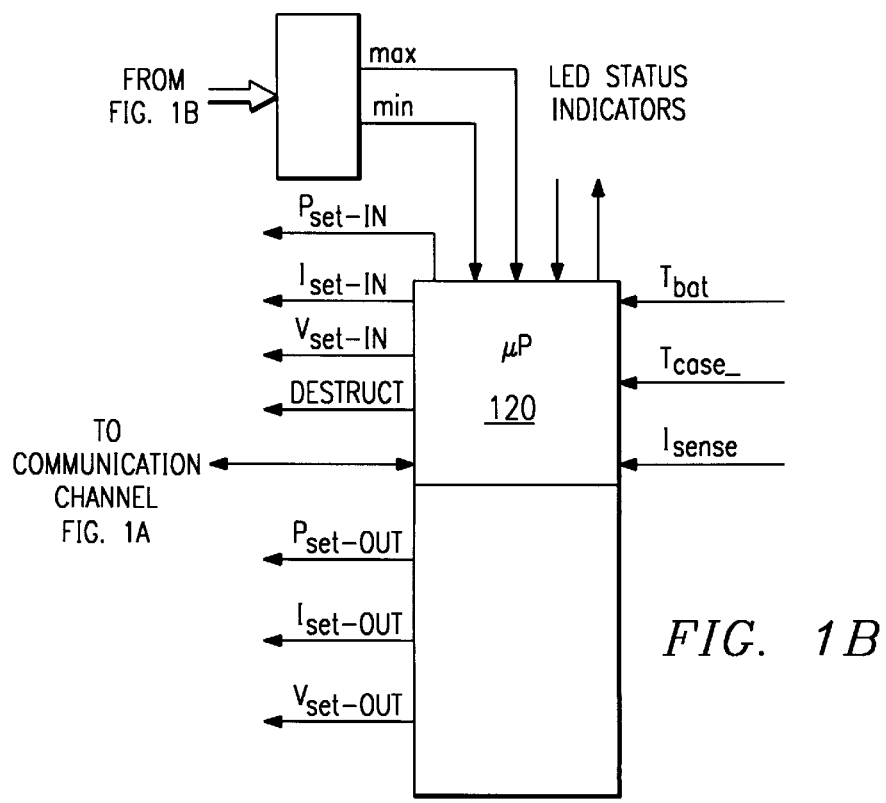

The numerous innovative teachings of the present application will be described with particular reference to the presently preferred embodiment (by way of example, and not of limitation), in which:

FIGS. 1A and 1B are two parts of a single figure, showing a sample battery controller board architecture. The particular topology shown provides ripple cancellation, but of course a variety of other topologies can be used instead.

Note that a polarity inversion occurs in the converter circuitry: the battery BATT is shown with its negative terminal uppermost.

The input connection to the positive side of voltage supply Vin is connected to the dotted end of inductor L1. The undotted end of inductor L1 is connected, through fuse F2, to the capacitor pair C1A/C1B. (This series-connected pair of capacitors is used for safety, since both capacitors would have to break down to create a DC pathway from the battery to Vin.) These are preferably polarized capacitors, and the undotted end of inductor L1 is preferably connected, through fuse F2, to the positive side of capacitor C1A.

The negative side of capacitor C1B is connected, through current-sensing resistor $R_{sense}$, to the negative terminal of the battery BATT. The positive terminal of the battery is connected, through fuse F1, to the undotted end of inductor L2. (Inductors L1 and L2 are coupled together, which reduces the total inductor mass, and also helps with ripple suppression as described below.) Inductors L1 and L2 preferably have equal values in this embodiment.

Switch Q1 is preferably a VDMOS power transistor, and when turned on will sink current from the undotted end of L1 to the negative side of Vin. The body diode of this transistor is also shown.

Switch Q2 too is preferably a VDMOS power transistor, and when turned on will sink current from the dotted end of L2 to the negative side of the battery. The body diode of this transistor is also shown.

Control circuit $CT_1$ controls switch Q1, and receives power from winding L3 which is inductively coupled to inductor L1. Control circuit $CT_1$ also receives a feedback voltage, from the voltage divider R1/R2/Ropt. Since the external resistor Ropt is connected as part of the voltage divider, its value will affect the value of the voltage ratio of this divider, and thus Ropt can change the voltage divider ratio into the error amplifier. This causes the regulated output voltage to shift, depending on the value of the external option resistor Ropt.

Control circuit $CT_2$ controls switch Q2, and receives a current-sensing input from sense resistor $R_{sense}$. The two control circuits $CT_1$ and $CT_2$ are synchronized, and indeed they do not have to be strictly separate. In normal operation, $CT_2$ provides a synchronous control signal to $CT_1$, so that $CT_1$ is slaved to $CT_2$.

Circuit 110 is a Vin testing circuit, which is more fully illustrated in FIG. 1C, and provides a signal to inhibit operation if Vin the battery voltage are both below limits.

FIG. 1B shows the connections of the microprocessor 120. The sense inputs include battery temperature Tbat, case temperature Tcase, and a current-sensing input Isense. The outputs $P_{set-IN}$, $I_{set-IN}$, $V_{set-IN}$, $P_{set-OUT}$, $I_{set-OUT}$, and $V_{set-OUT}$ provide setpoint signals to the real-time control loops which operate the converter. Specifically, output $P_{set-IN}$ determines the maximum-power setting under charging conditions, output $I_{set-IN}$ determines the maximum-current setting under charging conditions, output $V_{set-IN}$ determines the voltage setting under charging conditions, output $P_{set-OUT}$ determines the maximum-power setting under discharging conditions, output $I_{set-OUT}$ determines the maximum-current setting under discharging conditions, and output $V_{set-OUT}$ determines the voltage setting under discharging conditions. Communications between the system microprocessor and the innovative battery module microcontroller is by way of a communications channel circuit COMM CHANNEL.

Figure 1C:
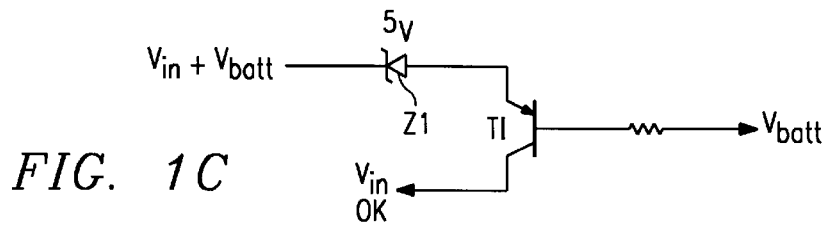
FIG. 1C shows a sample implementation of the Vin test circuitry in FIG. 1A.

FIG. 1C shows a very simple implementation of the Vin testing circuit 110. Zener Z1, in the presently preferred embodiment, provides a drop of 5V on the emitter of transistor T1. (The total drop is increased by one diode drop, and thus equals about 5.8V.) As shown in FIG. 1A, the capacitor (pair) C1A+C1B has an average voltage drop of Vin+Vbatt, so if Vin is not up to Vz+Vbe then the enable signal VinOK will not be active, and power will not be drawn from the external supply. (Of course, other circuit configurations can be used to change this voltage threshold.)

Figure 3:
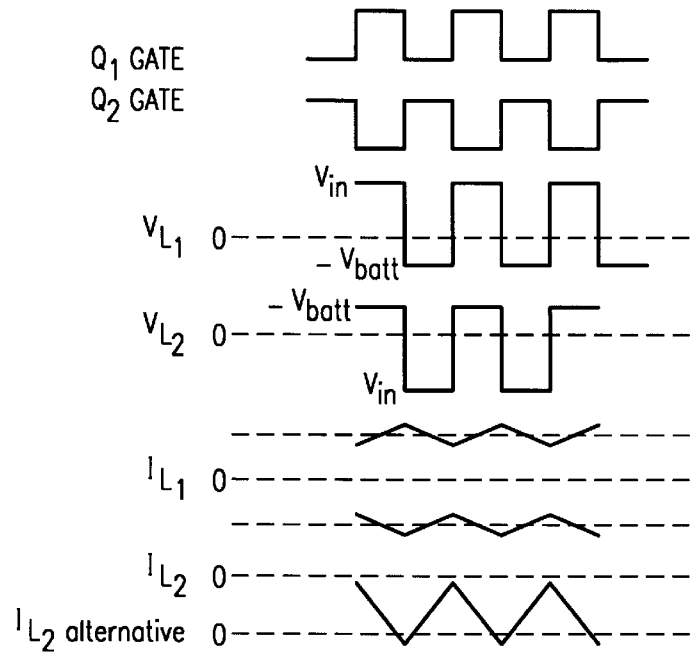
FIG. 3 shows waveforms during operation of the circuit of FIGS. 1A–1B.

FIG. 3 shows waveforms during operation of the circuit of FIGS. 1A–1B. The example shown is continuous operation, but of course discontinuous operation can also be used. As the top two lines of this Figure show, the gates of Q1 and Q2 are switched in opposition. When Q1 turns off (and Q2 turns on), the voltage on inductor L1 drops from Vin to −Vbatt, and the voltage on inductor L2 rises from −Vbatt to Vin. At this time the current $I_{L1}$ on inductor L1 begins to ramp down, and the current $I_{L2}$ on inductor L2 begins to ramp up. In the example shown by the solid trace, the current $I_{L1}$ varies around an average value of Pin over Vin, and the current $I_{L2}$ varies around an average value of Pbatt over Vbatt. (Pin and Pbatt represent the power flow at the external terminals and the electrochemical cells respectively, and will be equal apart from losses.) The bottom trace of FIG. 3 shows an alternative embodiment, in which $I_{L2}$ goes negative for a brief part of each cycle. This negative excursion can be used to recover energy stored on the switch capacitance, and thus provide zero-voltage switching.

It should be noted that this converter topology simply maintains a certain voltage ratio between the input and output terminals, regardless of the direction of power flow. (The control loop refines and stabilizes the precision and transient response, and allows current control and regulation.)

In the top two lines of FIG. 3, the duty cycles of Q1 and Q2 are approximately equal. However, by shifting the duty cycles, the voltage conversion ratio can be changed. The duty cycles for a given voltage ratio result from the condition that volt-seconds must balance: Q1's on-time ($T_{Q1on}$) times Vin will be equal to Q2's on-time ($T_{Q2on}$) times Vbatt.

$$\frac{V_{in}}{V_{batt}} = \frac{T_{Q2on}}{T_{Q1on}}$$

Thus to increase Vin, we increase Q2's on-time and reduce Q1's on-time.

In FIG. 3, it can also be seen that the AC component of the current on L2 is larger than the AC component of the current on L1. This shows asymmetrical ripple-steering, with a larger ripple reduction on L1 than on L2. By adjusting the coupling between the two inductors, the current ripple on L1 can be reduced to zero. In this case $I_{L1}$ will be a constant, as shown by the dashed lines in the $I_{L1}$ trace. (The voltage on $I_{L1}$ will still have an AC component, but the current will not.) In this case the ripple seen by the battery (on L2) would be increased, but in many cases, as discussed above, current ripple seen by the battery is less harmful than current ripple seen by the system. (Alternatively, the inductive coupling can be adjusted to steer the ripple onto L1 instead of L2, but this is less preferable.)

Figure 2:
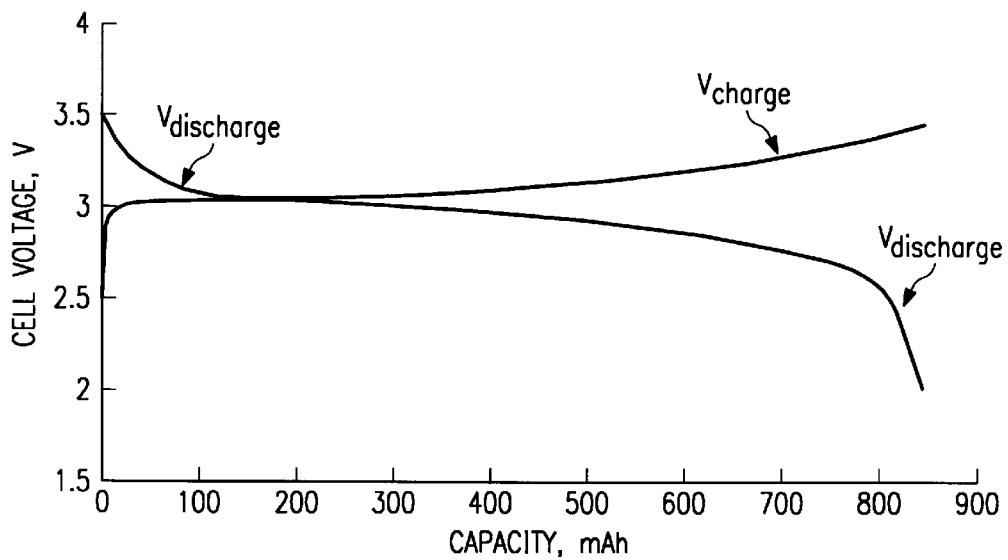
FIG. 2 shows an example of battery charge and discharge curves.

FIG. 2 shows an example of battery charge and discharge voltage curves. This specific example is taken from a AA-size Li/MnO$_2$ rechargeable battery of 850 mAh charge capacity, but is shown merely to illustrate general principles of charge/discharge management. Use of a larger or smaller cell size will change the horizontal scale of the curve, and use of multiple cells in series will change the vertical scale of the curve. Moreover, use of a different cell technology will change the shape of the curve.

A key point to observe about these curves is that they are not flat. (Discharge curves for other rechargeable battery technologies can be even less flat.) Note that the discharge voltage $V_{discharge}$ declines sharply from its initial value of about 3.4V, and reaches about 3V after about 150 mAh of discharge (18% of charge capacity). Thereafter the discharge voltage declines steadily until it reaches about 2.75V after about 650 mAh (76%) of discharge, and about 2.5V after about 800 mAh (94%) of discharge.

Currently, most complex electronic systems use a high-efficiency DC—DC converter to efficiently exploit the energy of the electrochemical cell despite the voltage changes during discharge. However, some of the simpler appliances which the disclosed universal battery can optionally power do not include such converters. Thus in such applications the universal battery can significantly improve the energy available from a given electrochemical cell. Even in systems which do include DC—DC converters, the regulated voltage of the universal battery permit the converters to be optimized for a single input voltage.

Note that the charging curve $V_{charge}$ is also not flat. Optimally efficient charging is usually less important than optimally efficient discharging, but the present invention permits charging too to be fully optimized if desired. This capability can be used to implement a variety of complex procedures for optimal charging.

Figure 4:
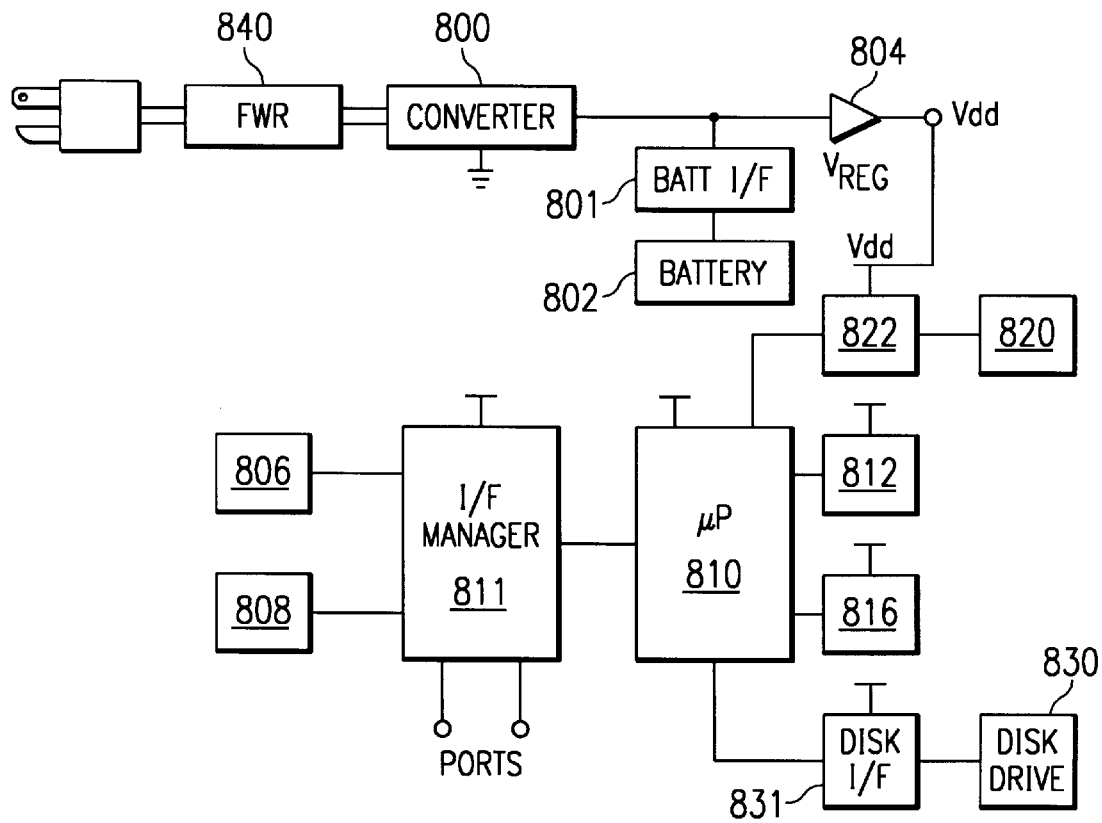
FIG. 4 shows a sample computer system incorporating the innovative architecture of FIG. 1.

FIG. 4 shows a sample computer system incorporating the innovative architecture of FIG. 1. This example is a portable computer system which includes a power converter 800 which is used to charge the battery 802, which contains the integral regulator. Optionally, a battery interface 801 is interposed between the battery and the rest of the circuitry. The power converter is connected, through a full-wave bridge rectifier 840, to draw power from AC mains, and is connected to provide a DC voltage to the battery. The battery 802 (or the converter 800), connected through a voltage regulator 804, is able to power the complete portable computer system, which includes, in this example:

user input devices (e.g. keyboard 806 and mouse 808);

at least one microprocessor 810 which is operatively connected to receive inputs from said input device, through an interface manager chip 811 (which also provides an interface to the various ports);

a memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor.

Optionally, of course, many other components can be included, and this configuration is not definitive by any means.

Figure 5:
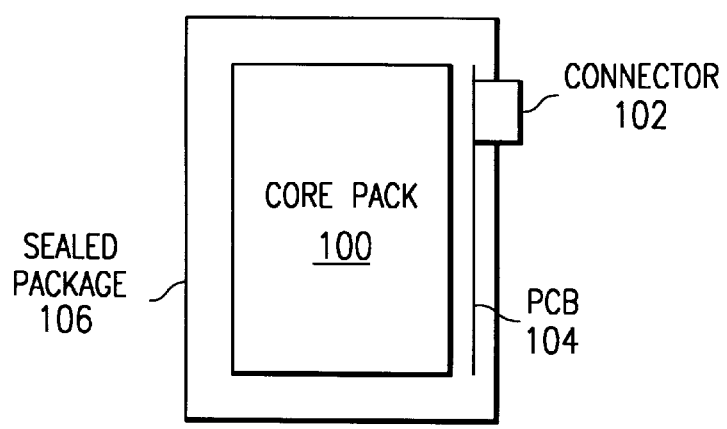
FIG. 5 shows a sample physical configuration of the universal battery module.

FIG. 5 shows a sample physical configuration of the universal battery module. The core pack 100 of electrochemical cells (preferably electrically connected in series, or alternatively in a series-parallel configuration) is mechanically and electrically connected to a small printed circuit board ("PCB") 104. Both the core 100 and the circuit board 104 are enclosed in a sealed package 106. (The sealed package 106, in this example, is not a totally hermetic seal, but is a sufficiently good seal to provide some protection against moisture and dirt.) A connector 102 extends from the board 104 out through the package 106, and provides terminals for connection to a mating connector in the computer system.

According to a disclosed class of innovative embodiments, there is provided: A battery pack subsystem, comprising: one or more electrochemical cells; external power terminals; and control circuitry which includes a switch-mode power converter which is connected to adjust the voltage ratio between said cells and said terminals; said control circuitry and said cells being packaged together as a single integral unit; and said control circuitry being powered during normal operation from said battery cells, and not from said output terminals except through said converter.

According to another disclosed class of innovative embodiments, there is provided: A method of operating a battery pack subsystem, comprising the steps of: when in a charging mode, operating a switching voltage converter which is integral to said battery pack subsystem to transfer power from a system power bus to one or more battery cells; and when in a discharging mode, operating said switching voltage converter to transfer power from said battery cells to said system power bus; wherein said converter is controlled by control circuitry which is powered from said battery cells, and not from said system power bus, during both said charging mode and said discharging mode.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

The programmability provided by the disclosed architecture permits a vast range of control algorithms to be implemented. For example, the output voltage can be varied, if desired, in accordance with control signals received from an application controller. This capability can be useful, for example, to permit data retention lifetime in sleep mode to be maximized.

For another example, one of the control options is the apparent source impedance of the battery. That is, when the load is drawing maximum current, the voltage of a battery will typically sag somewhat (due to the internal resistance of the battery conduction path, and due to less efficient electrochemical reactions at high current density). The degree to which voltage sags as current increases can be described by a number called "source impedance." One of the options which can be programmed into the universal battery module described above is a programmable source impedance (within limits set by the maximum power output of the battery and the maximum power-handling capability of the converter circuit.

For another example, the converter circuit configuration can be modified to provide multiple isolated outputs at different voltages, if desired.

The integrated converter topology shown is especially advantageous, but is not the only topology which can be used. For example, a simple buck-boost converter topology can also be used. Alternatively and thus preferably, many other converter topologies can also be used, as detailed in the books cited below.

Preferably the converter topology is fully bidirectional, so that the battery voltage can be above or below the system voltage; but this is not strictly necessary.

Operation of the battery at a high voltage increases the required ratings on the switching transistor, and increases the potential loss on the transistors. However, if the converter's topology is chosen so that the switching transistors operate with zero voltage switching (or close to it), this source of inefficiency can be reduced or nearly eliminated.

Alternatively, if the battery cell configuration is chosen to operate at lower voltage (and hence higher current for a given output power), resistive losses will increase, and these are not as easy to reduce. A further disadvantage with operating in the high-current regime is that, even if the switching transistors are made very large to reduce resistive losses due to $R_{ds-ON}$, heat sinking may still be necessary at some level of current, and heat sinking is difficult to do in a battery module.

A further advantage of the high voltage configuration is that the individual cell voltages can more easily be monitored. It is common in lithium-ion cell batteries to monitor voltages at the individual nodes in a serious connection. However, where cells are connected in a series-parallel configuration, there is no way to distinguish between the cell voltages of the parallel-connected cells.

For another example, the converter topology can alternatively be configured for boost-in, buck-out. For a given total energy this permits use of a purely series-connected stack of cells, if desired. This avoids the problems of reverse-biased cells, which can occasionally occur with series-parallel batteries under worst-case conditions.

For another example, for ultrasonic transducer applications a modified circuit configuration can be used to provide ultrasonic drive power directly from the battery module if desired.

For another example, for communications applications a modified circuit configuration can even be used to provide an RF signal output from the battery module (at VLF or higher frequencies) if desired. Optionally, this RF output can be modulated by an external control signal if desired.

For another example, a modified circuit configuration can even be used to provide an AC power output from the battery module if desired.

For another example, a very-low-power wireless data link can optionally be used to provide some communication between the battery module and the application or system.

The following background publications provide additional detail regarding possible implementations of the disclosed embodiments, and of modifications and variations thereof. See generally Pressman, SWITCHING POWER SUPPLY DESIGN (1991); the 3 volumes of Middlebrook and Ćuk, ADVANCES IN SWITCHED-MODE POWER CONVERSION (2.ed. 1983); and all of the biennial UNITRODE POWER SUPPLY DESIGN SEMINAR HANDBOOKS; all of which are hereby incorporated by reference.

In a further alternative embodiment, the system voltage can be reprogrammed by sending appropriate commands through the communications interface (possibly a wireless interface) to the controller in the universal battery module.

In one contemplated alternative embodiment, the universal battery module can be modified to include an AC adapter. This would require inclusion of an AC connector, a full-wave rectifier, and preferably also a surge suppressor of some sort, and possibly also a filter. It would also be necessary to use switching devices with high enough voltage ratings to handle the power line voltages reliably, but the premium for this voltage capability is steadily declining. The use of transistors with higher standoff voltage ratings normally implies that the series resistances will also be higher (for a given transistor size). Thus added heat sinking may be necessary in this embodiment.

For another example, within the constraints well-known to those of ordinary skill, power MOS transistors can be replaced by IGBT and/or MCT devices, with appropriate allowance for reduced turn-off times. In some applications power bipolar devices can also be used.

In an alternative embodiment, a bypass circuit is added to provide some power to the control circuit when the battery cells are exhausted, but otherwise it is preferable to power all control circuitry from the battery side and not from the systems side. This is particularly advantageous in battery technologies (such as NiCd) where the cells can be completely exhausted. However, even in this embodiment, all control circuitry is preferably powered from the battery side and not from the systems side, except for the very small bleed current which flows when the battery is exhausted.

What is claimed is:

1. A battery pack subsystem, comprising:
   one or more electrochemical cells;
   external power terminals; and
   control circuitry which includes a switch-mode power converter which is connected to adjust the voltage ratio between said cells and said terminals;
   said control circuitry and said cells being packaged together as a single integral unit; and
   said control circuitry being powered during normal operation from said battery cells, and not from said output terminals except through said converter.

2. A computer system, comprising:
   a user input device; a microprocessor operatively connected to detect inputs from said input device; memory which is connected to be read/write accessible by said microprocessor; and
   a detachable battery pack subsystem, connected to other parts of said computer system through first and second external power terminals, and which comprises, in a single sealed module:
   one or more electrochemical cells, collectively having first and second current-carrying connections;
   control circuitry which includes a switch-mode power converter which is connected to adjust the voltage ratio between said cells and said terminals;

said control circuitry being powered during normal operation from said battery cells, and not from said output terminals except through said converter.

3. A method of operating a battery pack subsystem, comprising the steps of:

when in a charging mode, operating a switching voltage converter which is integral to said battery pack subsystem to transfer power from a system power bus to one or more battery cells; and when in a discharging mode, operating said switching voltage converter to transfer power from said battery cells to said system power bus;

wherein said converter is controlled by control circuitry which is powered from said battery cells, and not from said system power bus, during both said charging mode and said discharging mode.

4. The method of claim 3, wherein said converter has a DC-isolated topology.

5. The method of claim 3, wherein said converter has a DC-isolated polarity-inverting topology.

6. The method of claim 3, wherein said converter includes an isolating element which creates DC isolation between said external terminals and said cells, and wherein said controller includes a master portion operating a first power switch and powered through a linear regulator by said cells and a slave portion operating a second power switch and powered indirectly in dependence on said master portion.

7. The method of claim 3, wherein said controller includes a master portion operating a first power switch and a slave portion operating a second power switch.

8. The method of claim 7, wherein said slave portion is also connected to a low-current power connection which permits said slave portion to draw a limited amount of power from said system bus at times when said cells are too depleted to power said slave portion.

9. The system of claim 1, wherein said control circuitry monitors battery temperature, case temperature, and sense current.

10. The system of claim 1, wherein said control circuitry provides voltage, current, and power setpoint signals to real-time control loops which operate said converter.

11. The system of claim 1, wherein said control circuitry communicates with a system microprocessor.

12. The system of claim 1, wherein said converter is controlled to maintain a predetermined voltage ratio.

13. The system of claim 1, wherein said controller includes a master portion operating a first power switch and a slave portion operating a second power switch.

14. The system of claim 1, wherein said converter has a DC-isolated topology.

15. The system of claim 1, wherein said converter has a DC-isolated polarity-inverting topology.

16. The system of claim 1, wherein said converter has a DC-isolated transformerless topology.

17. The system of claim 2, wherein said control circuitry monitors battery temperature, case temperature, and sense current.

18. The system of claim 2, wherein said control circuitry provides voltage, current, and power setpoint signals to real-time control loops which operate said converter.

19. The system of claim 2, wherein said control circuitry communicates with said microprocessor.

20. The system of claim 2, wherein said converter has a DC-isolated topology.

21. The system of claim 2, wherein said converter has a DC-isolated polarity-inverting topology.

22. The system of claim 2, wherein said converter has a DC-isolated transformerless topology.

23. The system of claim 2, wherein said converter is controlled to maintain a predetermined voltage ratio.

24. The system of claim 2, wherein said controller includes a master portion operating a first power switch and a slave portion operating a second power switch.

25. The method of claim 3, wherein said control circuitry monitors battery temperature, case temperature, and sense current.

26. The method of claim 3 wherein said control circuitry provides voltage, current, and power setpoint signals to real-time control loops which operate said converter.

27. The method of claim 3, wherein said control circuitry communicates with a system microprocessor.

28. The method of claim 3, wherein said converter is controlled to maintain a predetermined voltage ratio.

* * * * *